United States Patent
Seleznev et al.

(10) Patent No.: US 9,291,050 B2
(45) Date of Patent: Mar. 22, 2016

(54) DETERMINING FORMATION WETTABILITY FROM DIELECTRIC MEASUREMENTS

(75) Inventors: Nikita Seleznev, Cambridge, MA (US); Tarek M. Habashy, Burlington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 777 days.

(21) Appl. No.: 12/241,569

(22) Filed: Sep. 30, 2008

(65) Prior Publication Data

US 2010/0078165 A1 Apr. 1, 2010

(51) Int. Cl.
*E21B 49/00* (2006.01)
*G01V 3/26* (2006.01)

(52) U.S. Cl.
CPC .. *E21B 49/00* (2013.01); *G01V 3/26* (2013.01)

(58) Field of Classification Search
CPC .................................. E21B 49/00; G01V 3/26
USPC ................................ 73/152.01, 152.08; 702/7
See application file for complete search history.

(56) References Cited

U.S. PATENT DOCUMENTS

| | | | | |
|---|---|---|---|---|
| 4,502,009 A | * | 2/1985 | Rodiere et al. | 324/337 |
| 4,790,180 A | * | 12/1988 | Sinnokrot | 73/152.07 |
| 5,209,104 A | * | 5/1993 | Collins et al. | 73/38 |
| 5,233,522 A | * | 8/1993 | Sinclair | 702/7 |
| 5,335,542 A | * | 8/1994 | Ramakrishnan et al. | 73/152.08 |
| 5,434,507 A | * | 7/1995 | Beren et al. | 324/338 |
| 5,610,524 A | * | 3/1997 | Longeron et al. | 324/376 |
| 5,679,885 A | * | 10/1997 | Lenormand et al. | 73/38 |
| 6,061,634 A | * | 5/2000 | Belani et al. | 702/12 |
| 7,032,661 B2 | * | 4/2006 | Georgi et al. | 166/250.01 |
| 7,327,146 B2 | * | 2/2008 | Simon | 324/355 |
| 7,363,160 B2 | * | 4/2008 | Seleznev et al. | 702/7 |
| 7,532,983 B2 | * | 5/2009 | Montaron | 702/7 |
| 7,863,901 B2 | * | 1/2011 | Seleznev et al. | 324/337 |
| 8,538,700 B2 | * | 9/2013 | Badri et al. | 702/7 |
| 8,593,140 B2 | * | 11/2013 | Saldungaray et al. | 324/303 |
| 8,766,641 B2 | * | 7/2014 | Pindiprolu et al. | 324/347 |
| 8,794,318 B2 | * | 8/2014 | Harrigan et al. | 166/264 |
| 2004/0000905 A1 | * | 1/2004 | Freedman et al. | 324/303 |
| 2004/0055745 A1 | * | 3/2004 | Georgi et al. | 166/250.02 |
| 2006/0108112 A1 | * | 5/2006 | Simon | 166/254.2 |
| 2007/0061082 A1 | * | 3/2007 | Seleznev et al. | 702/11 |
| 2007/0112518 A1 | * | 5/2007 | Montaron | 702/1 |
| 2007/0276639 A1 | * | 11/2007 | Montaron et al. | 703/10 |
| 2011/0198078 A1 | * | 8/2011 | Harrigan et al. | 166/254.2 |
| 2012/0011927 A1 | * | 1/2012 | Badri et al. | 73/152.05 |

(Continued)

OTHER PUBLICATIONS

Knight, "The Use of Dielectric and NMR Measurements to Determine the Pore-Scale Location of Organic Contaminants," 1998, Univ. British Columbia.*

(Continued)

*Primary Examiner* — John Fitzgerald
(74) *Attorney, Agent, or Firm* — Jakub Michna

(57) ABSTRACT

Formation wettability is quantifiably estimated from measurements of dielectric constant and conductivity. In particular, wettability state of formation rock in a subterranean environment is estimated from multi-frequency measurements of rock dielectric constant and conductivity. A dielectric dispersion model is used to invert the measurements and estimate the saturation exponent. The resulting saturation exponent is used to quantify wettability, e.g., by calculating a wettability index.

22 Claims, 7 Drawing Sheets

(56) References Cited

U.S. PATENT DOCUMENTS

| | | | |
|---|---|---|---|
| 2012/0153958 A1* | 6/2012 | Anderson et al. | 324/332 |
| 2012/0192640 A1* | 8/2012 | Minh et al. | 73/152.16 |
| 2014/0062489 A1* | 3/2014 | Pindiprolu et al. | 324/347 |
| 2015/0127264 A1* | 5/2015 | Hadj-Sassi et al. | 702/7 |

OTHER PUBLICATIONS

Bona et al., "Characterization of Rock Wettability Through Dielectric Measurements," 1998, Revue de L'Institut Francais du Petrole, vol. 53, No. 6.*

Abdallah, Wael, "Fundamentals of Wettability", Oilfield Review, Summer 2007, May 2007 Schlumberger Wettability Workshop, Bahrain, pp. 41-61, 2007.

Amott, Earl, "Observations Relating to the Wettability of Porous Rock", Union Oil Co. of California, Petroleum Transactions AIME, vol. 269, 1959, pp. 156-162.

Archie, GE, "Electrical Resistivity an Aid in Core-Analysis Interpretation", Bulletin of the American Association of Petroleum Geologists, vol. 31, No. 2, Feb. 1947, pp. 350-366.

Bona et al, "Electrical Measurements in the 100 Hz to 10 GHz Frequency Range for Efficient Rock Wettability Determination", SPE 69741, Mar. 2001, 1999 SPE International Symposium on Oilfield Chemistry, Houston, Feb. 16-19, pp. 80-88.

Bona et al, "Wettability and Dielectric Constant", Proceedings of the Annual Meeting of the Society of Core Analysts, SCA-9925, 1999.

Donaldson et al, "Relationship Between the Archie Saturation Exponent and Wettability", SPE 16790 SPE Formation Evaluation, Sep. 1989, University of Oklahoma, pp. 359-362.

Donaldson et al, "Wettability Determination and Its Effect on Recovery Efficiency", SPEJ (Mar. 1969) pp. 13-20.

Ellis et al, "Introduction to Well Log Interpretation: Finding the Hydrocarbon", Well Logging for Earth Scientists, 2nd edition, published by Springer, Dodrecht, The Netherlands, ISBN 978-1-4020-3738-2, 2007, pp. 19-39.

Seleznev et al, "Dielectric Mixing Laws for Fully and Partially Saturated Carbonate Rocks", SPWLA 45th Annual Logging Symposium, Jun. 6-9, 2004, 14 pages.

Seleznev et al, "Formation Properties Derived from a Multi-Frequency Dielectric Measurements", SPWLA 47th Annual Logging Symposium, Jun. 4-7, 2006, 12 pages.

Sihvola et al, "Polarizability and Effective Permittivity of Layered and Continuously Inhomogeneous Dielectric Ellipsoids", Journal of Electromagnetic Waves and Applications, vol. 4, No. 1, pp. 1-26, 1990.

Sweeney et al, "The Electrical Resistivity of Preferentially Water-Wet and Preferentially Oil-Wet Carbonate Rock", Producers Monthly, No. 7, May 1960, pp. 29-32.

* cited by examiner

DETERMINING FORMATION WETTABILITY FROM DIELECTRIC MEASUREMENTS

FIELD OF THE INVENTION

The invention is generally related to borehole logging and log interpretation, and more particularly to estimating formation wettability from dielectric constant and conductivity measurements.

BACKGROUND OF THE INVENTION

The term "wettability" describes the tendency of a fluid to spread on, and adhere to, a solid surface in the presence of other immiscible fluids, i.e., to "wet" the surface. Within a subterranean hydrocarbon reservoir, wettability influences relative permeabilities, residual oil saturation and capillary pressure. Consequently, it becomes important to be able to estimate reservoir wettability.

Laboratory analysis of core samples can estimate reservoir wettability. However, this is both costly and time consuming. For example, several weeks may be required to perform a wettability test using the Amott or USBM technique, and practical constraints limit the extent and number of cores that can be analyzed. In addition, the reservoir wettability conditions can change by the time samples undergo laboratory analysis, thereby rendering the results inaccurate. Therefore, it is beneficial to determine rock wettability in-situ in its original unaltered state.

Bona, N., and Capacciolo, S., 2001, "Electrical Measurements in the 100 Hz to 10 GHz Frequency Range for Efficient Rock Wettability Determination", SPE Journal, March, pp. 80-88 describes a technique that identifies oil-wet rock by comparing the high- and the low-frequency conductivity of the rock. If the high-frequency conductivity is higher than the low-frequency conductivity then the rock is assumed to be oil-wet. However, this result is merely qualitative. Bona, N., Rossi and Capaccioli, S., 1999, "Wettability and Dielectric Constant", Proceedings of the Annual Meeting of the Society of Core Analysts, SCA-9925 describes the response of glass bead samples and Berea sandstones with various wettability between 100 Hz and 100 MHz. Apparent differences in the water- versus oil-wet sample responses are noted. However, wettability effects are not decoupled from other critical parameters such as rock porosity, water saturation and water salinity.

SUMMARY OF THE INVENTION

In accordance with another embodiment of the invention, a method for estimating formation wettability comprises: obtaining at least one formation dielectric measurement and formation conductivity measurement; and estimating wettability based on the obtained measurements. A saturation exponent can be calculated based on obtained measurements and used to estimate wettability (see Archie, G. E., 1947, "Electrical Resistivity an Aid in core-analysis interpretation", AAPG Bulletin, vol. 31, No. 2, pp. 350-366). Further, dielectric measurements may be inverted with a dielectric wettability model in order to directly estimate a wettability index, which indicates the wettability state of the rock. The index can change between +1 for completely water-wet and −1 for a completely oil-wet rock following the Amott-Harvey index, or can be rescaled to reflect the USBM index.

In accordance with another embodiment of the invention, an apparatus for estimating formation wettability comprises: a module including at least one sensor that measures at least one of formation dielectric constant and formation conductivity; and an analyzer that estimates wettability based on the obtained measurements. The analyzer is operative to calculate a saturation exponent based on obtained measurements, and estimate wettability based on the calculated saturation exponent. Further, the analyzer is operative to invert the dielectric measurements with a dielectric wettability model in order to calculate the saturation exponent and/or a wettability index.

Advantages of the invention include quantifying formation wettability quickly and efficiently. Wettability calculation in accordance with the invention does not require retrieval of cores and laboratory analysis. Rather, in at least some circumstances, on-site calculation of wettability can be made in real time or near real time. Further, the measurement and calculation can be partially or fully automated, thereby mitigating the need for highly skilled personnel.

Further features and advantages of the invention will become more readily apparent from the following detailed description when taken in conjunction with the accompanying drawings.

BRIEF DESCRIPTION OF THE FIGURES

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

Figure 1:
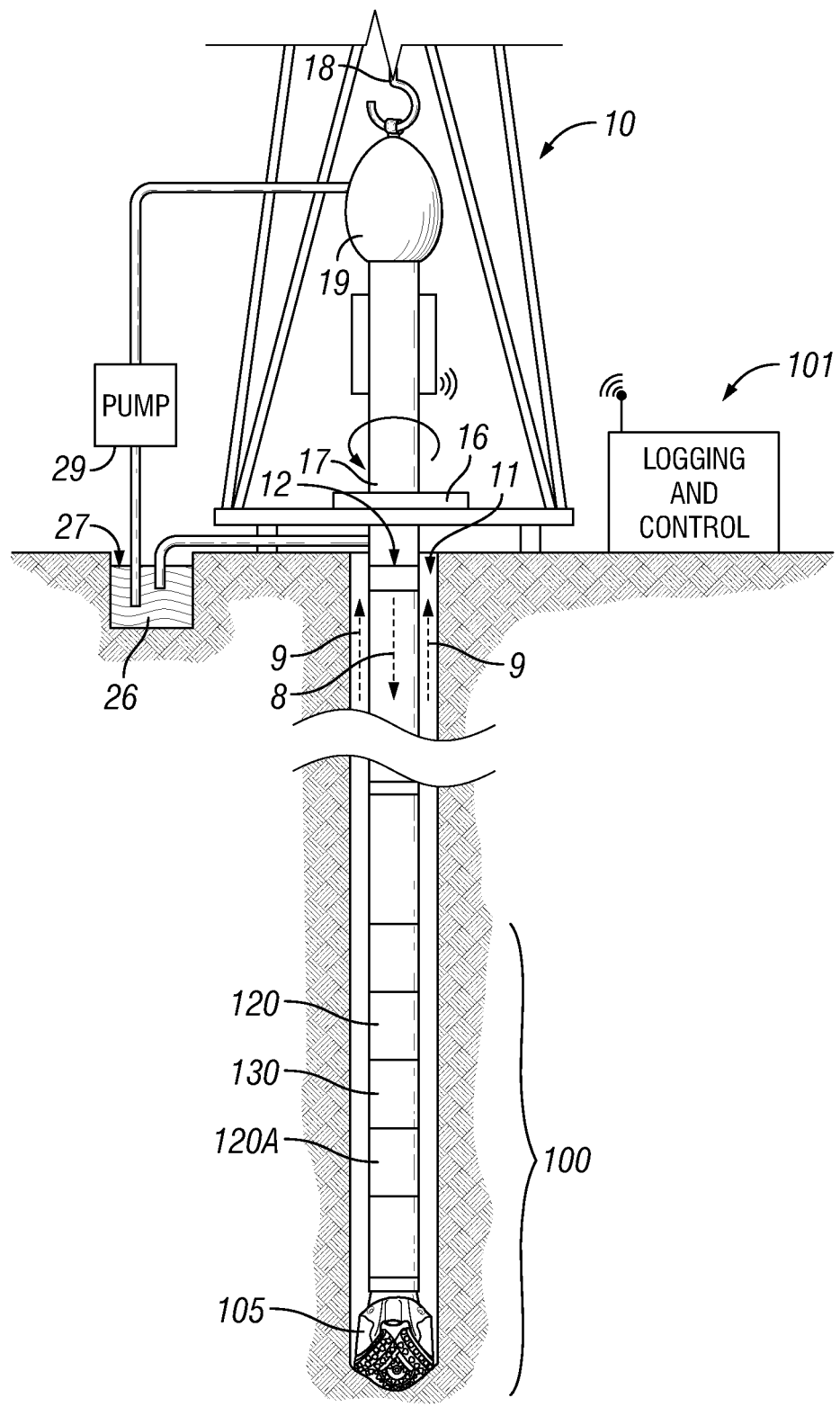
FIG. 1 illustrates a wellsite system in which the present invention can be employed.

FIG. 1 illustrates apparatus for implementing at least some embodiments of the present invention. A borehole (11) is formed in subsurface formations by rotary drilling. A drill string (12) is suspended within the borehole (11) and has a bottom hole assembly (100) which includes a drill bit (105) at one end. Surface equipment includes a platform and derrick assembly (10) positioned over the borehole (11). The assembly (10) includes a rotary table (16), kelly (17), hook (18) and rotary swivel (19). The drill string (12) is rotated by the rotary table (16), which engages the kelly (17) at the upper end of the drill string. The drill string (12) is suspended from a hook (18), attached to a traveling block, through the kelly (17) and a rotary swivel (19) which permits rotation of the drill string relative to the hook. A top drive system could alternatively be used. Drilling fluid or mud (26) is stored in a pit (27) formed at the well site. A pump (29) delivers the drilling fluid (26) to the interior of the drill string (12) via a port in the swivel (19), causing the drilling fluid to flow downwardly through the drill string (12) as indicated by the directional arrow (8). The drilling fluid exits the drill string (12) via ports in the drill bit (105), and then circulates upwardly through the annulus region between the outside of the drill string and the wall of the borehole, as indicated by the directional arrows (9). In this well known manner, the drilling fluid lubricates the drill bit (105) and carries formation cuttings up to the surface as it is returned to the pit (27) for recirculation.

Data, including but not limited to dielectric and conductivity data, are gathered with a module and provided to a logging and control analyzer (101). The module may be of any type, including but not limited to wireline type and logging while drilling type. The bottom hole assembly (100) of the embodiment illustrated in FIG. 1 includes a logging-while-drilling (LWD) module (120), a measuring-while-drilling (MWD) module (130), a roto-steerable system and motor, and drill bit (105). The LWD module (120) is housed in a special type of drill collar, as is known in the art, and can contain one or a plurality of known types of logging tools. It will also be understood that more than one LWD and MWD module can be employed, e.g. as represented at (120A). The LWD module includes capabilities for measuring, processing, and storing information, as well as for communicating with the surface equipment. In the present embodiment, the LWD module includes a pressure measuring device. The MWD module (130) is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 2:
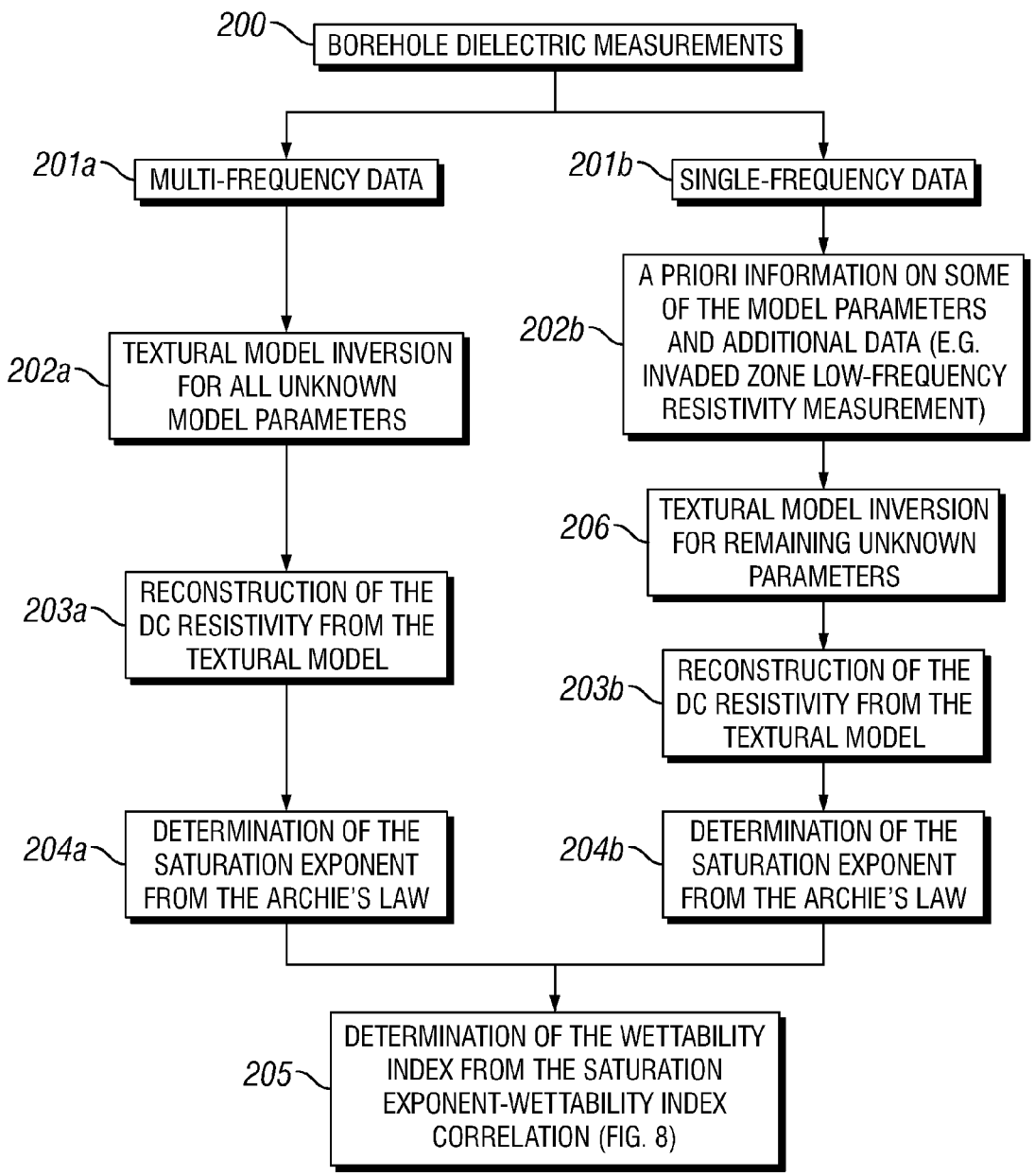
FIGS. 2 and 3 illustrate methods for quantitatively estimating the wettability state of the rock of a subterranean formation as a function of single or multi-frequency measurements of rock dielectric constant and conductivity.

FIG. 2 illustrates a method implemented by the apparatus of FIG. 1 for quantitatively estimating the wettability state of the rock of a subterranean formation as a function of measurements of rock dielectric constant and conductivity. The method begins with obtaining dielectric measurements (200). The measurements can be both multi-frequency (201a) or single-frequency data (201b). These measurements are subsequently inverted with a dielectric wettability model, either for all unknown parameters (202a) in the case of multi-frequency data or, using a priori information (202b), for a reduced set of unknown model parameters (206) with single-frequency data. Once the unknown model parameters are determined, the next step (203a, 203b) is to reconstruct the DC resistivity in accordance with the algorithm described in published application US-2007-0061082. After that, the saturation exponent is determined with the Archie's law (204a, 204b) and, finally, the wettability index is determined from the correlation between the wettability index and saturation exponent (205).

Measured conductivity strongly decreases with increased oil-wetness, which corresponds to a strong increase in the saturation exponent. The saturation exponent can be predicted from dielectric measurements based on the model, and the saturation exponent can subsequently be used to obtain a wettability index based on the dependence of rock conductivity on rock wettability. The method can advantageously be partially or fully automated, and can potentially yield wettability estimates in real time or near real time.

Figure 4:
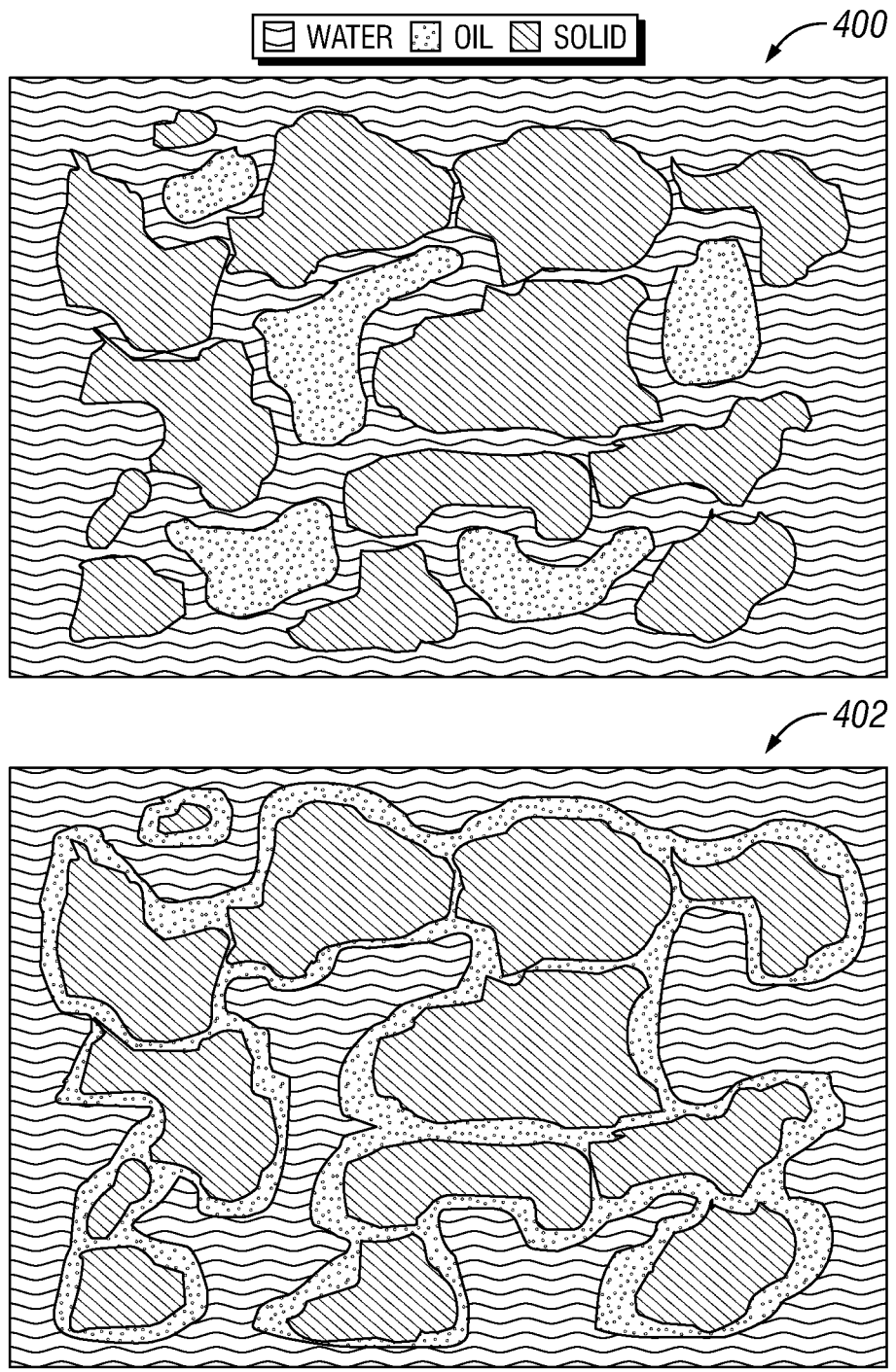
FIG. 4 illustrates oil and brine phase distribution in case of water-wet and oil-wet rock.

Referring to FIG. 4, the method is predicated on certain characteristics of phase distribution within the formation. Dielectric measurements in the subterranean environment are affected by the spatial arrangement of the conductive and non-conductive phases in rocks, i.e., "rock texture." Rock (solid) wettability affects spatial distribution of conductive (brine/water) and non-conductive (hydrocarbon/oil) phases within the pore space and, therefore, the dielectric characteristic of the rock. In the case of strongly water-wet rock (400), fluid covers the surface of the grains and forms a conductive network. The hydrocarbon phase is predominantly situated in the center of the pores and is surrounded by the conductive brine. In the case of strongly oil-wet rock (402), the hydrocarbon phase covers pore walls and surrounds the conductive brine phase that is predominantly placed in the center of the larger pores. This reverse distribution of the conductive and non-conductive phases has several effects. In oil-wet rocks the conductive brine phase does not form a continuous connected network, but is progressively isolated into local clusters as a function of increasing oil-wetness. This leads to a strong decrease in rock conductivity. In addition, the brine and hydrocarbon phases have measurably different dielectric constants, and rearrangement of these phases leads to a change in the overall dielectric constant of the rock.

Figure 5A:
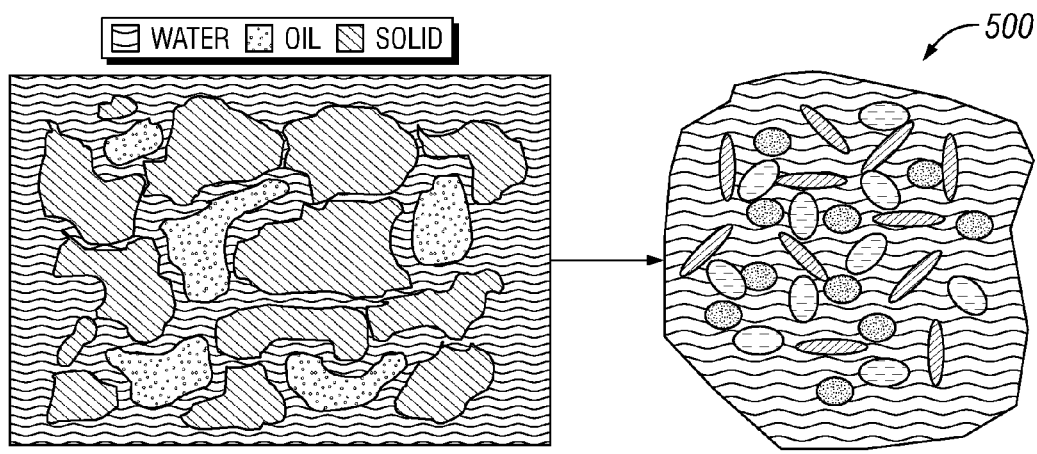
FIG. 5 illustrates textural/wettability dielectric model corresponding to variable wettability scenarios.
Figure 5B:
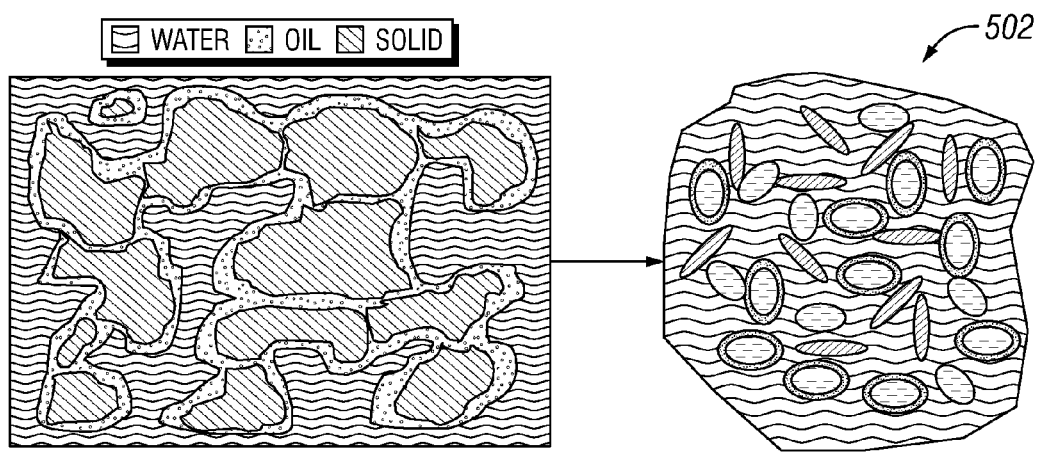

Referring now to FIG. 5, based on the above-described characteristics it is possible to generate a textural model (500) which describes the dielectric properties of water-wet rocks having significantly different texture. One suitable technique is described by Seleznev, N., T. Habashy, A. Boyd, and M. Hizem, 2006. "Formation properties derived from a multi-frequency dielectric measurement", the SPWLA 47 Annual Logging Symposium held in Veracruz, Mexico, June 4-7, paper VVV, which is incorporated by reference. Also, more details can be found in published application US-2007-0061082. In the case of mixed-wet or oil-wet rock, a fraction of the pores is covered with a layer of hydrocarbons reflecting distribution of the conductive and non-conductive phases on oil-wet pores. The oil-wet fraction of the pores increases with increasing oil-wetness of the rock. Therefore, a wettability model (502) can also be generated.

Dielectric measurement interpretation requires that a relationship be established between the dielectric properties of rocks and their constituents. Comparison of experimental data obtained on partially oil/brine saturated carbonate rocks with various mixing laws showed that the complex refractive index (CRI) mixing law was a good approximation of the rock dielectric properties at a frequency of 1 GHz (see Seleznev N, Boyd A, Habashy T and Luthi S: "Dielectric Mixing Laws for Fully and Partially Saturated Carbonate Rocks," paper CCC presented at the SPWLA 45th Annual Logging Symposium, Noordwijk, The Netherlands (Jun. 6-9, 2004)). It became clear, however, that the dielectric measurement is also sensitive to the rock texture, especially at lower frequencies, and that a proper use of the dielectric measurement needs to take this into account.

A new model, the textural model, that includes rock texture, matches rock dielectric properties over a wide frequency range more successfully (see Seleznev N, Habashy T, Boyd A and Hizem M: "Formation Properties Derived from a Multi-Frequency Dielectric Measurement," paper VVV, presented at the SPWLA 46$^{th}$ Annual Logging Symposium, Veracruz, Mexico (June 4-7, 2006)). The textural model starts from an "average" rock behaviour observed experimentally and then introduce texture effects as refinements to this "average" model. This approach ensures that our estimates of the dielectric constant and conductivity are close to those of the experimentally observed values for partially saturated rocks and hence provides a quantitative agreement with the experimental data. The textural model has an average or background behavior described by the CRI model, then incorporates ellipsoidal grains and pores to reflect the influence of texture on dielectric properties over a wide frequency range (500).

Pores, grains, and oil inclusions are represented as oblate spheroids—ellipsoids with two longer axes of equal length. The formulation of the model using these ellipsoids can be calculated analytically. One additional geometrical parameter is added for each phase: the aspect ratio, or the ratio of the long to the short axis of the oblate spheroid. Rocks with thinner insulating regions—flatter grains with higher aspect ratio—exhibit greater dielectric and conductivity dispersion. Wettability also influences the rock dielectric response. The extension of the textural model to the mixed- and oil-wet case, the wettability model, is shown in (502). In case of mixed-wet or oil-wet rock a fraction of the pores is covered with a layer of hydrocarbons reflecting distribution of the conductive and non-conductive phases on oil-wet pores. The oil-wet pores are modeled as confocal oblate spheroids, whose effective permittivity can be obtained analytically (see Sihvola, A. and Lindell, V., 1990, "Polarizability and Effective Permittivity of Layered and Continiously Inhomogeneous Dielectric Ellipsoids", J. of Electromagnetic Waves and Applications, vol. 4, No. 1, pp. 1-26). Once the permittivity of the oil-wet pores is calculated the wettability model follows the computational path of the textural model, but including both water-wet and oil wet pores in proportion prescribed by the wettability index.

Figure 6:
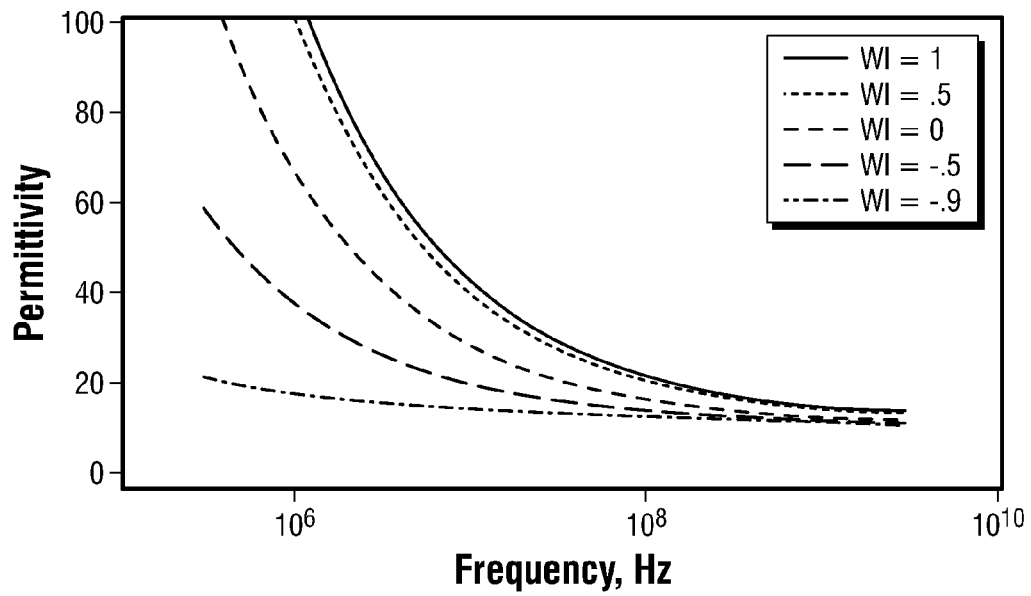
FIGS. 6 and 7 illustrate the effect of variable wettability on dielectric and conductivity dispersion curves. The wettability index changes from +1 for completely water-wet rock to −0.9 for strongly oil-wet rock. Other parameters, such as texture, water saturation and water salinity are kept constant.
Figure 7:
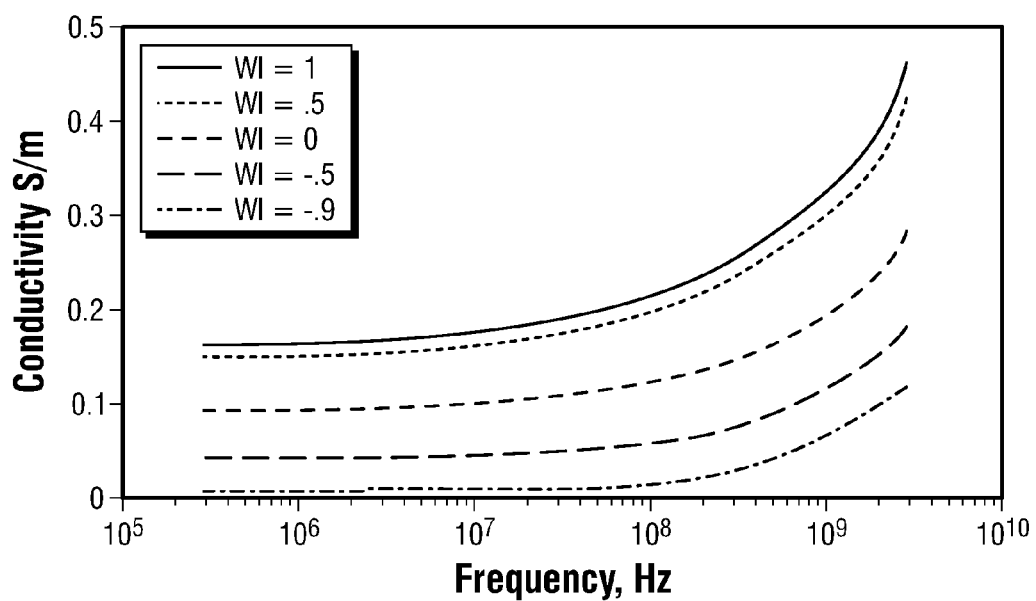

The oil-wet fraction of the pores increases with increasing oil-wetness of the rock. The effect of variable wettability on dielectric properties of rocks is shown in FIGS. 6 and 7 All parameters are maintained constant except for the wettability index (WI) of the rock, which is defined as a fraction of the oil-wet pores relative to the total pore volume and normalized to span the [1,−1] range reflecting the Amott-Harvey index. The strong decrease in rock conductivity with increasing oil-wetness is evident. The WI is defined as the fraction of the oil-wet pores relative to the total pore volume, normalized to span the range [1,−1] reflecting the Amott-Harvey index, i.e., +1 for completely water-wet and −1 for a completely oil-wet rock. The rock conductivity (and resistivity) can be approximated with empirical formula, e.g., the so-called Archie's law (Archie, G.E., "Electrical Resistivity, An Aid in Core-Analysis Interpretation", Bullet. of Amer. Assoc. of Petroleum Geolog., vol. 31, No. 2, pp.350-366, 1947). This equation relates rock porosity, water saturation and water conductivity to the rock conductivity via two empirical parameters, i.e., the cementation and saturation exponents. The cementation exponent is determined from the measurement of the conductivity of a fully saturated sample and is a characteristic topology of the pore space. The saturation exponent characterizes the conductivity behavior of partially saturated rock and, therefore, is a function of the distribution of the hydrocarbon phase in the rock. The strong decrease in the rock conductivity with increasing oil-wetness directly translates into a strong increase in the saturation exponent. Therefore, the wettability state of the rock (and its wettability index) can be estimated from the saturation exponent value. For example, multi-frequency dielectric measurements can be utilized to estimate the rock saturation exponent (as described in published application US-2007-0061082), and the rock saturation exponent can be used to estimate the wettability index. Although the rock saturation exponent can be estimated from dielectric measurements using the above-mentioned extension of the textural model to variable wettability, other models and techniques can alternatively be applied.

Figure 3:
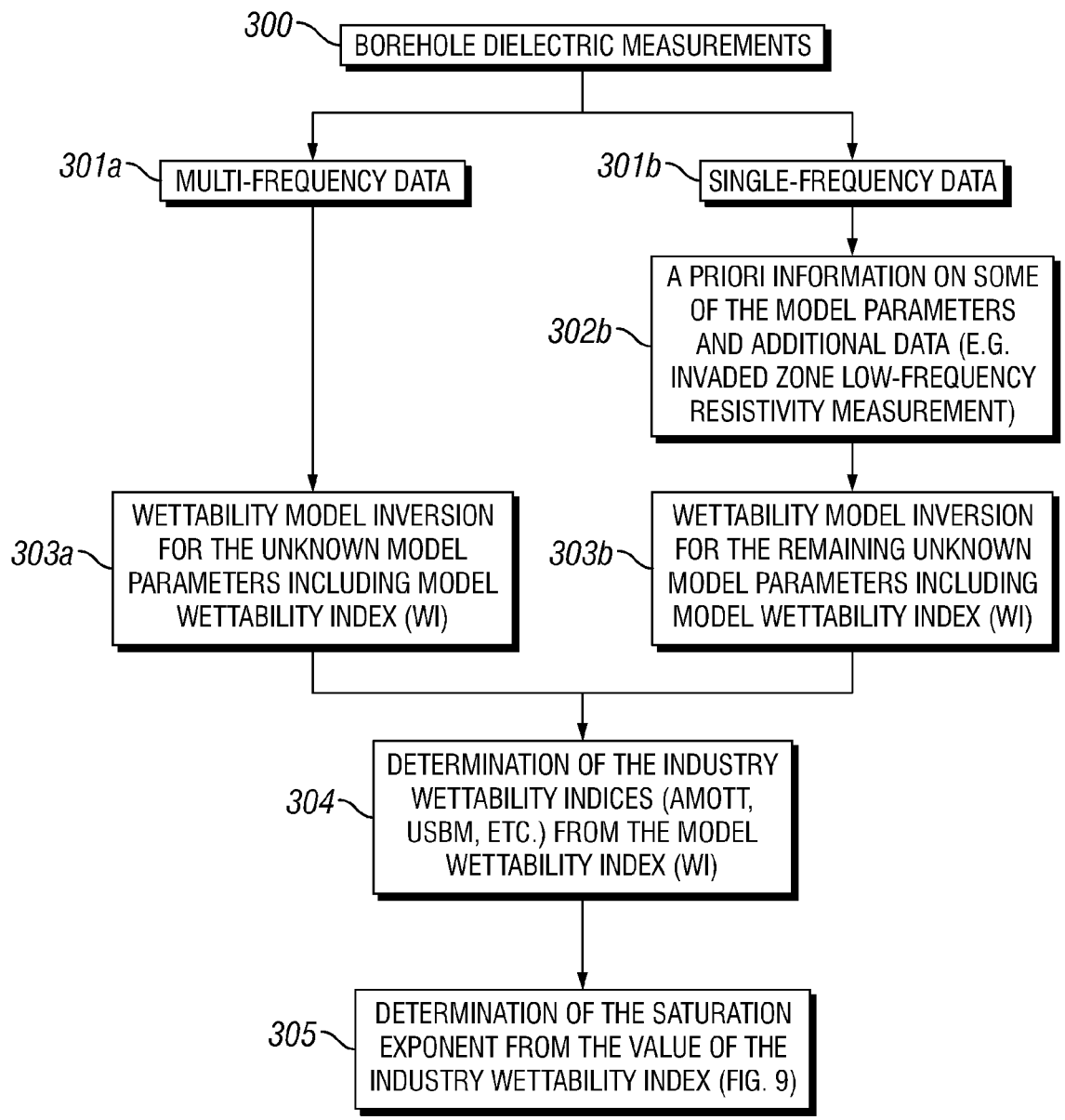
Figure 9:
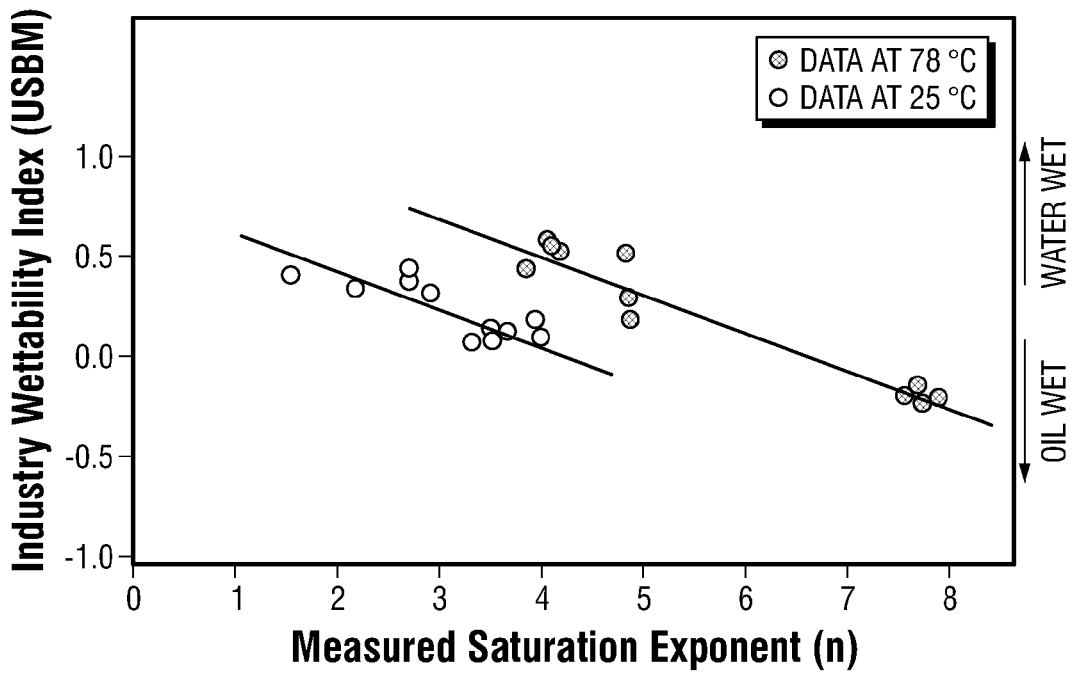
FIG. 9 is a plot of industry wettability index as a function of measured saturation exponent for data at 78 and 25° C.

FIG. 3 illustrates a method implemented by the apparatus of FIG. 1 for quantitatively estimating the wettability state of the rock of a subterranean formation. The method begins with obtaining dielectric measurements (300). The measurements can be both multi-frequency (301a) or single-frequency data (301b). These measurements are subsequently inverted with a wettability model for unknown model parameters (including model wettability index (WI)) in the case of multi-frequency data (303a) or, using a priori information on some of the model parameters and additional data (e.g., invaded zone low-frequency resistivity measurement) (302b) in the case of single-frequency data (303b). Next, industry wettability indices (Amott, USBM, etc.) are determined from the model wettability index (WI) (304) and the saturation exponent is determined from the value of the industry wettability index, using for example the relationship in FIG. 9 (305).

Figure 8:
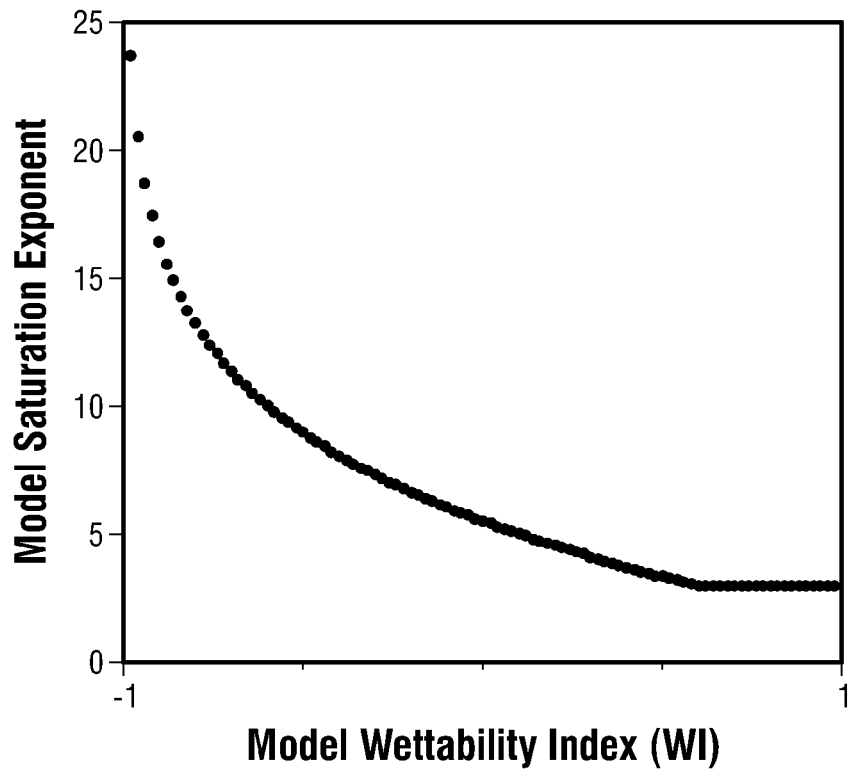
FIG. 8 illustrates correspondence between the saturation exponent and wettability index.

FIG. 8 illustrates correspondence between the saturation exponent and wettability index. It is evident that the saturation exponent is strongly dependent on the wettability index, and thus can be utilized to estimate the latter. Alternatively, the explicit determination of the saturation exponent can be omitted altogether, and the dielectric measurements can be directly inverted to obtain the wettability index.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for estimating wettability of a formation, the method comprising:
performing dielectric measurements of the formation using a dielectric logging tool to obtain dielectric data;
providing the dielectric data to a logging analyzer;
calculating a saturation exponent based on the dielectric data using the logging analyzer; and
estimating wettability of the formation based on the calculated saturation exponent using the logging analyzer.

2. The method of claim 1, wherein the wettability of the formation comprises a wettability index.

3. The method of claim 1, wherein the performing dielectric measurements of the formation comprises measurements at multiple frequencies.

4. The method of claim 1, wherein the dielectric logging tool is a wireline tool.

5. The method of claim 1, further comprising:
inverting the dielectric data using a dielectric dispersion model to determine model parameters.

6. The method of claim 5, wherein the dielectric dispersion model is a textural model.

7. The method of claim 5, further comprising
determining resistivity of the formation using the model parameters.

8. The method of claim 7, wherein calculating the saturation exponent based on the dielectric data comprises calculating the saturation exponent using the resistivity of the formation and Archie's law.

9. A method for estimating wettability of a formation, the method comprising:
performing dielectric measurements of the formation using a dielectric logging tool to obtain dielectric data
providing the dielectric data to a logging analyzer; and
estimating wettability of the formation based on the dielectric data using the logging analyzer, wherein estimating wettability of the formation based on the dielectric data comprises inverting the dielectric data with a dielectric wettability model.

10. The method of claim 9, further comprising:
calculating a saturation exponent from the wettability.

11. The method of claim 9, wherein the performing dielectric measurements of the formation comprises measurements at multiple frequencies.

12. Apparatus for estimating wettability of a formation, the apparatus comprising:
a module including at least one sensor configured to measure a dielectric constant of the formation; and
an analyzer that is configured to (i) calculate a saturation exponent based on the dielectric constant of the formation and (ii) estimate wettability of the formation based on the calculated saturation exponent.

13. The apparatus of claim 12, wherein the wettability of the formation comprises a wettability index.

14. The apparatus of claim 12, wherein the module is configured to measure a dielectric constant of the formation at multiple frequencies.

15. The apparatus of claim 12, wherein the module is a wireline tool.

16. The apparatus of claim 12, wherein the analyzer is configured to invert the dielectric constant using a dielectric dispersion model to determine model parameters.

17. The apparatus of claim 16, wherein the dielectric dispersion model is a textural model.

18. The apparatus of claim 16, wherein the analyzer is configured to determine resistivity for the formation using the model parameters.

19. The apparatus of claim 18, wherein calculating the saturation exponent based on the dielectric constant comprises calculating the saturation exponent using the resistivity of the formation and Archie's law.

20. Apparatus for estimating wettability of a formation, the apparatus comprising:
a module including at least one sensor configured to measure a dielectric constant of the formation; and
an analyzer that is configured to estimate wettability of the formation based on the dielectric constant of the formation, wherein the analyzer is configured to invert the dielectric constant of the formation with a dielectric wettability model.

21. The apparatus of claim 20, wherein the analyzer is configured to calculate a saturation exponent from the wettability.

22. The apparatus of claim 20, wherein the module is configured to measure a dielectric constant of the formation at multiple frequencies.

\* \* \* \* \*